(No Model.)
J. F. DAVENPORT.
ROTARY WATER METER.
No. 249,162.     Patented Nov. 8, 1881.
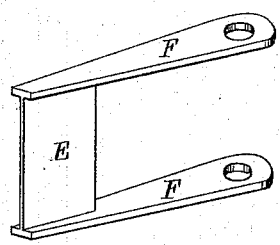
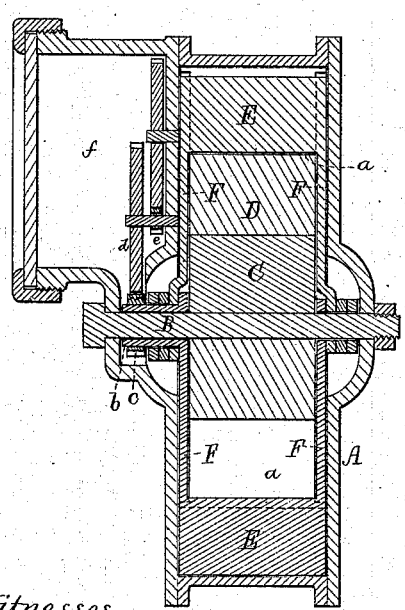
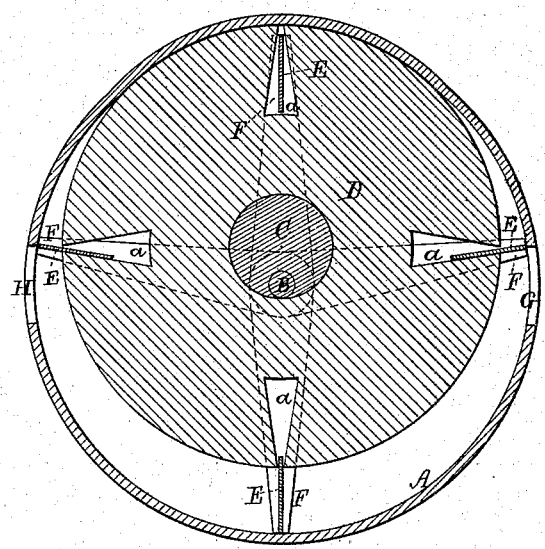
Witnesses
S. N. Piper.
E. B. Pratt
Inventor.
James F. Davenport.
by R. H. Eddy atty.

UNITED STATES PATENT OFFICE.

JAMES F. DAVENPORT, OF FALL RIVER, MASSACHUSETTS.

ROTARY WATER-METER.

SPECIFICATION forming part of Letters Patent No. 249,162, dated November 8, 1881.

Application filed August 5, 1881. (No model.)

*To all whom it may concern:*

Be it known that I, JAMES F. DAVENPORT, of Fall River, of the county of Bristol and State of Massachusetts, have invented a new and useful Improvement in Water-Meters; and I do hereby declare the same to be described in the following specification and represented in the accompanying drawings, of which—

Figure 1 is a longitudinal section, and Fig. 2 a transverse section, of a water-meter containing my invention. Fig. 3 is a perspective view of one of its paddles and its pair of sustaining-arms.

The nature of my invention is defined in the claim hereinafter given.

In Figs. 1 and 2 of the drawings, A denotes a cylindrical or approximately cylindrical case, having at its axis a spindle, B, which is arranged transversely within the said case, and fixed thereto so as to be stationary in position. This spindle carries a cylinder, C, whose axis is eccentric relatively to that of the spindle, the said cylinder being stationary in position and extending through and being concentric with a larger cylinder, D, arranged within the case A, and with the upper edge of its periphery in contact with that of the inner circumference of the case. The cylinder D is to revolve freely on the cylinder C, and there is within the cylinder D a series of wedge-shaped recesses, *a a a a*, which extend inward from its periphery and open through such, in manner as represented. In each of such recesses is one of a series of paddles, E, each of such paddles being supported by and fixed to two arms, F, extending from and arranged to turn on the spindle B. There are within the case A, at opposite parts of its periphery, two openings, G H. On water under pressure being caused to flow into either of such openings it will act against the lower paddle or paddles and move such within the case in a manner to cause the cylinder D to revolve on the cylinder C, all the paddles in the meantime being in contact with the inner periphery of the case. The water passing through the crescental space between the cylinder D and the surrounding case will escape through the other opening.

By having fixed to one of the arms, or a tubular shaft, *b*, projecting from it, as shown, a gear, *c*, and having to such gear a train of two or more gears, *d e*, arranged in an extension, *f*, of the case, and provided with one or more dials and hands like the registering apparatus of a common gas-meter, the amount of water passing in any given period through the case A may be measured or ascertained.

The meters described and represented in the United States Patents 7,075 and 33,126 differ very materially from that hereinbefore explained, as in neither is the drum carrying the paddles arranged to revolve on a cylinder eccentric to the axis of the case, and, furthermore, there is within the first of such patented meters a spring to operate with the paddle-drum and its case, and in the second of such meters there is an abutment to operate with the rotary paddle-carrier, there being no such devices in my improved meter. Therefore,

I claim—

The combination of cylinder or drum D, slotted or recessed and arranged within the case A in manner as explained, with the cylinder C within and eccentric to the said case, as described, and with the series of paddles E arranged within the said drum or cylinder D and supported by arms F, adapted to turn on an arbor at the axis of and within and concentric with the case, all being substantially as and to operate in manner and for the purpose set forth.

JAS. F. DAVENPORT.

Witnesses:
GEO. A. BALLARD,
EDWARD BUFFINGTON.